United States Patent

[11] 3,592,546

| [72] | Inventor | Robert A. Gussman |
| | | 12 Greenwood Road, Canton, Mass. 02021 |
| [21] | Appl. No. | 878,801 |
| [22] | Filed | Nov. 21, 1969 |
| [45] | Patented | July 13, 1971 |

[54] CONDENSATION NUCLEI DETECTOR
13 Claims, 1 Drawing Fig.

[52] U.S. Cl. .................................................. 356/37,
250/218, 356/103
[51] Int. Cl. ................................................... G01n 1/00,
G01n 15/00
[50] Field of Search ........................................ 356/37,
103, 104, 201; 250/218

[56] References Cited
UNITED STATES PATENTS

| 2,684,008 | 7/1954 | Vonnegut .................. | 356/37 |
| 2,956,435 | 10/1960 | Rich ........................... | 356/37 |
| 3,463,589 | 8/1969 | Skala ......................... | 356/37 |

OTHER REFERENCES

Radke et al.: " An Automatic Cloud Condensation Nuclei Counter," JOURNAL OF APPLIED METEOROLOGY Vol. 8, Feb. 1969, pages 105— 109

*Primary Examiner*—Ronald L. Wibert
*Assistant Examiner*—F. L. Evans
*Attorney*—Wolf, Greenfield, Hieken & Sacks ABSTRACT: A condensation nuclei particle detector is provided that is capable of continuous operation. An air sample possible containing nuclei is humidified and then passed to a contact chamber in which a water droplet is formed about each nuclei by introducing supercooled nuclei-free air into the chamber. The contact chamber has associated with it, (1) a porous, annular, outer chamber through which the supercooled air is radially introduced to the contact chamber to cause the supersaturation of the humid air, (2) optical or other means for indicating the nuclei concentration of the air sample, and (3) an exhaust port through which the sample exits.

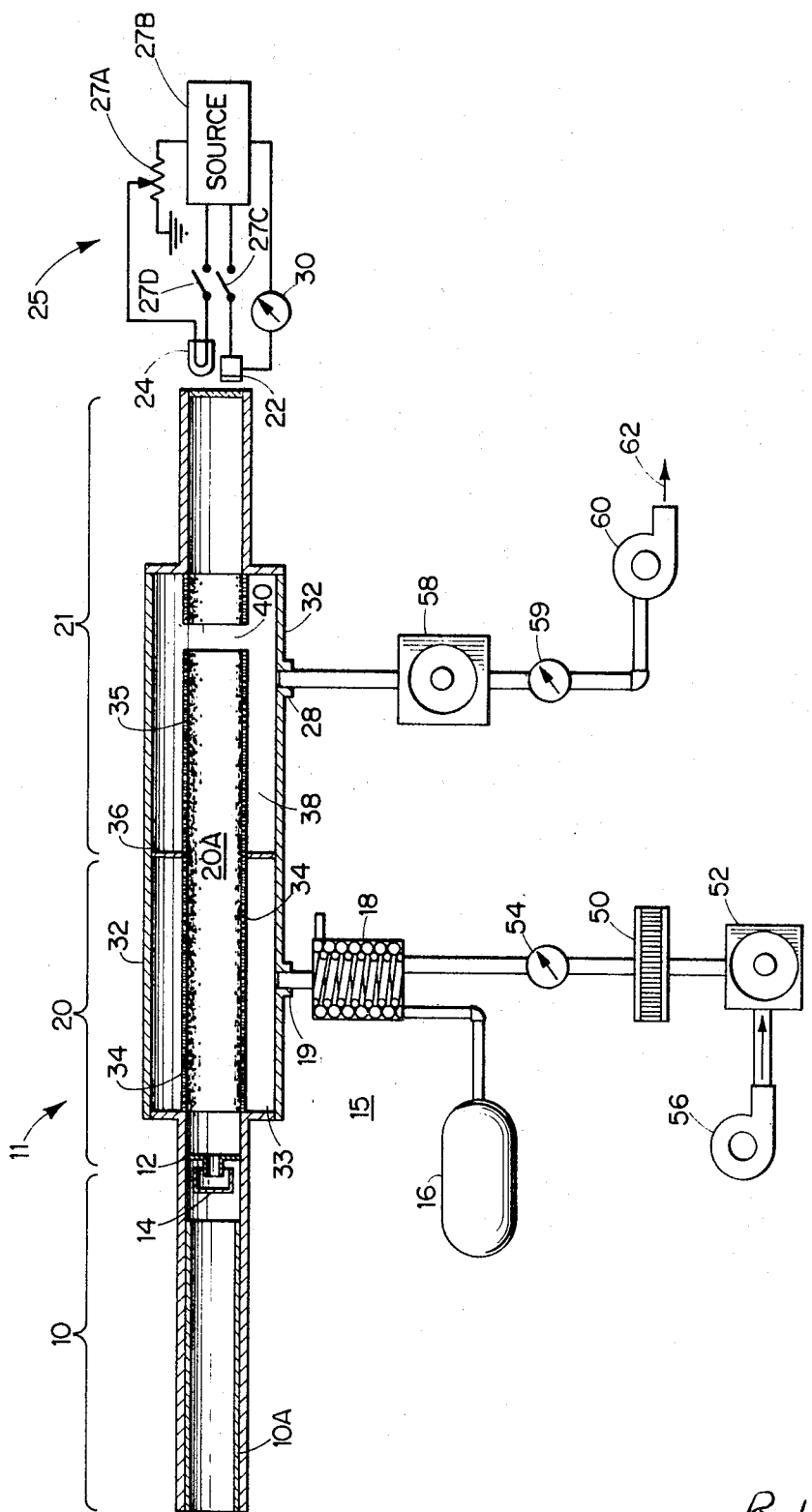

3,592,546

CONDENSATION NUCLEI DETECTOR

BACKGROUND OF THE INVENTION

The present invention generally relates to particle detectors, and more particularly, the invention relates to particle detectors of the condensation nuclei counter type. These counters are particularly useful for detecting the number concentration of nuclei in a gaseous sample such as air. These measurements may be used for a variety of purposes including air pollution measurements.

Conventional light-scattering techniques have proven to be ineffective for the direct detection of submicron particles. Particularly those that are less than 0.1 microns in diameter. Condensation nuclei counters have been used to remedy this. With these nuclei counters, a water droplet is formed about each nuclei, thereby increasing the effective size. Known light-scattering or other techniques can then be employed for the measurement of the number concentration of the nuclei particles.

The growth of the water droplets occurs by initially passing the nuclei containing air sample through a humidifier. A supercooled secondary nuclei-free airstream then causes the humidified air sample to be cooled and supersaturated. These conditions cause water vapor to condense on nuclei present within the air sample. Once formed, the droplets grow in a matter of milliseconds to a size capable of observation by light-scattering or other techniques. The amount of light scattered is proportional to the number of droplets present in the chamber, the usable scattering area and other criteria. A photomultiplier tube or photocell is then arranged to measure the nuclei concentration of the sample.

One of the disadvantages of existing condensation nuclei counters is that they do not provide continuous operation. One of the difficulties preventing the construction of a continuous operation instrument is the layerlike depositions of ice that form on the inside of the contact chamber. This happens when cooling of the humidified air sample in the contact chamber is attempted where the growth of the nuclei occurs. The necessary periodic removal of these deposits has not allowed for the continuous operation of the counter.

SUMMARY OF THE INVENTION

One object of the present invention, therefore, is to provide an improved condensation nuclei counter.

Another object of this invention is to provide a condensation nuclei counter that is capable of continuous operation.

Another object of this invention is to avoid the buildup of ice deposits in the interior of a condensation nuclei counter.

Still another object of the present invention is to provide a nuclei counter of simple construction, and which requires little maintenance.

According to the invention, the condensation nuclei counter comprises contact chamber that is preferably tubular in shape and has an inlet end adapted to receive the air sample stream. The expansion chamber is also provided with an exhaust port which communicates with a pump means, that allows for the continuous flow of the air sample through the contact chamber. Means are provided for humidifying the air sample as it enters the contact tube. Dry filtered air is then rapidly cooled and passed through a porous surface of the contact tube, thereby causing supersaturation of the air sample and attendant nuclei growth. Optical means are associated with the contact chamber for measuring the number concentration of the condensation nuclei.

BRIEF DESCRIPTION OF THE DRAWING

The single figure is a diagrammatic showing of a particle detector constructed in accordance with this invention.

DETAILED DESCRIPTION

The condensation nuclei counter generally includes a contact tube, supercooling means, an optical or other detector and means for exhausting the air once its nuclei-contents has been sampled. The air to be sampled is introduced into the contact tube where the nuclei are effectively grown by passing supercooled, dried air through a porous cylindrical surface of the tube. This causes supersaturation of the air sample and attendant nuclei growth. This growth occurs rapidly and is detected by an optical or other detection arrangement. The air is continually exhausted by appropriate pump means.

The contact tube or chamber 11 generally includes an input humidifier section 10, a contact mixing section 20 and an exhaust section 21. Cooling means 15, which includes a heat exchanger 18, introduces dry, cooled nuclei-free air through cylindrical porous casing 34 of section 20 to chamber 20A, thereby causing water droplet growth about the nuclei particles contained in chamber 20A. Optical detection means 25 located at the right of tube 11 includes a lamp 24 and photodetector 22 and a meter 30 for indicating the nuclei number concentration. Tube 11 also is provided with exhaust port 28 for continuously discharging supersaturated air sample.

Tubular humidifier section 10 of chamber 11 is provided to humidify the air sample as it passes through it. In the embodiment shown the interior of section 10 is lined with a felt or blotting paper 10A that has been premoistened. Humidities in excess of 95 percent can be readily achieved with such an arrangement. Another means of causing the humidification of the air sample is by constructing humidifier section 10 of a porous ceramic material through which water can be introduced. Humidifier section 10 is depicted as being formed as in integral part of tube 11. However it is contemplated that separate detachable tube sections may be used in place of the arrangement shown. Similarly, section 21 may be detachable from section 20.

The effective nuclei growth takes place in the central chamber 20A of tube section 20. The supercooled and dried airstream is introduced into chamber 20A through chamber 33 and port 19. Chamber 33 is defined by concentric tubular casings 32 and 34 and annular separator 36. The porous inner casings 34 may be constructed of a ceramic, glass or metal sinter, which allows the cooled, dried air to penetrate therethrough.

One important feature of the present invention is the use of a porous casing that allows the cooled, dried nuclei-free air to be introduced radially to the humidified air sample. With such an arrangement, the internal surface of casing 34 does not collect ice deposits. There is, therefore, no attendant clogging of chamber 20A.

In the embodiment shown the cooling of air to $-40°$ F. at the rate of 1 litre per minute is achieved by expanding a coolant such as freon, which is contained in source 16, from a pressure of, for example 140 p.s.i. to atmospheric pressure. Since the cooling requirement is only on the order of 3 B.T.U.'s per hour, the calculated use rate for the freon will permit about 10 hours operation per pound of freon. The heat exchanger tube 18 accepts the expanding freon and supercools the cleaned, dried air supplied from pump 56. Pump 56 is adapted to control the rate at which air is forced through heat exchanger 18 into chamber 20A. Drying means 52 and filter 50 respectively dry and filter the air, prior to its introduction into heat exchanger 18. Meter 54 connected between pump 56 and heat exchanger 18 registers the pumping rate in litres per minute.

Other means may be used to cool, dry, and filter the secondary air stream. For example, the cooling could be accomplished by thermal electric means conventional refrigeration means, or merely by packing the heat exchanger tube 18 in regular or dry ice. Other flow rates and heat exchange rates may also be used.

Tube 11 also includes exhaust section 21 generally extending between annular separator 36 and window 42. Section 21, in turn, includes chamber 38, which is formed between section 35 and outer section 32. Inner casing 35 is not usually constructed of a porous material. Annular slit 40 in inner casing 35 allows the grown nuclei to flow from chamber 20A to chamber 38. The nuclei are then forcibly exited by way of exhaust port 28, with the aid of pump 60.

The optical detecting means 25 includes a lamp 24, a photodetector 22 and a reflecting mirror 14. In the embodiment shown, the mirror 14 has a U-shaped cross section and is cylindrical in shape as viewed from the detecting means 25. Mirror 14 is located between the sections 10 and 20 of expansion tube 11 and is adapted to reflect light from lamp 24 back to detector 22. Annular ring 12 which has an L-shaped cross section prevents any external light from effecting the measurement made by photodetector 22. Various other types of maze structures other than that shown could also be located between sections 10 and 20 to prevent external light from entering chamber 20A. The optical detection means 25 also includes a potentiometer 27A and power source 27B, along with switches 27C and 27D. The fixed ends of potentiometer 27A are connected between source 27B and ground while the wiper arm is connected to lamp 24. The light output of lamp 24 may be varied by adjusting potentiometer 27A. Meter 30, located between source 27B and photodetector 22 is adapted to register the current in terms of the number concentration of nuclei in the sample of air. Switches 27C and 27D, respectively, connect the lamp and photodetector to the source 27B.

The light-scattering arrangement illustrated has the advantage of housing the light and photodetector in a single compact unit and also doubles the effective light path. The lamp and photodetector are located sufficiently far away from exhaust port 28 so as to prevent soiling of the lamp and detector. With the depicted arrangement, the light detection is based upon direct obscuration; however, a back-scattering technique without the use of a mirror may also be employed.

The measured air sample is drawn from chamber 20A into chamber 38 and out through exhaust port 28. This action occurs continuously by means of pump 60 which forces the air sample out through port 28. The dryer 58 and meter 59 are situated between exhaust port 28 and pump 60, and dryer 58 prevents clogging of the flow meter, while meter 59 enables an operator of the apparatus to monitor the exhaust flow by adjusting the force output of pump 60. Output port 62 of pump 60 is connected to an appropriate vent (not shown), to allow for the continuous escape of the supersaturated sampled air.

The table below depicts one set of operating conditions, for the apparatus of the present invention. Some of the values listed below were assumed while others were derived by using (1) the Gibbs-Thompson equation, which relates supersaturation to particle size, and (2) the conservation of energy theorem.

TABLE I

| | Sample stream | Cooled secondary stream | Exhaust stream |
|---|---|---|---|
| Mass flow, lb./min | $2.64 \times 10^{-3}$ | $2.64 \times 10^{-3}$ | $5.28 \times 10^{-3}$ |
| Temperature, °F | 170[1] | −40 | 33 |
| Rel. humidity, percent | 100 | 0 | 200 |
| Abs. humidity lb./lb. | $15.8 \times 10^{-3}$ | 0 | $7.9 \times 10^{-3}$ |

[1] Ambient.

The mass flow of the exhaust stream is equal to the sum of the mass flow of the sample stream and the secondary stream. The sample air is humidified to 100 percent relative humidity whereas the secondary airstream relative humidity is essentially 0 percent. note that the secondary airstream is cooled to −40° F to cause a supersaturation of 200 percent. If it becomes necessary to sense smaller particles the Gibbs-Thompson equation indicates that the percent supersaturation has to increase and the temperature of the secondary stream would have to be lowered. The above table represents only one of many possible operation conditions.

Having now described the apparatus of the present invention I claim:

1. A particle detector for determining the nuclei concentration of a gaseous sample comprising,
    means for humidifying the sample,
    means for generating a supercooled, substantially dried secondary airstream,
    a nuclei contact chamber operatively coupled to said humidifying means and said generating means,
    means associated with the chamber for introducing said secondary airstream and the sample stream into said chamber,
    said secondary air stream mixing with said sample stream within said chamber to cause supersaturation of said nuclei of said sample stream thereby causing nuclei condensation growth within said chamber, and
    means proximate to said chamber for detecting the nuclei concentration.

2. A particle detector as defined in claim 1 and further comprising means for exhausting the supersaturated nuclei stream from said chamber.

3. A particle detector as defined in claim 1 wherein said humidifying means includes a tubular section integrally formed with said chamber.

4. A particle detector as defined in claim 3 wherein said tubular section includes a moistened felt liner substantially covering the inner surface of said tubular section.

5. A particle detector as defined in claim 1 wherein said generating means includes a filtering means to remove substantially all nuclei from said secondary airstream.

6. A particle detector as defined in claim 1 wherein said generating means includes a heat exchanger and means for expanding a coolant fluid into said heat exchanger, for causing the supercooling of said secondary airstream.

7. A particle detector as defined in claim 1 wherein said means for introducing said secondary airstream includes a porous wall portion.

8. A particle detector as defined in claim 7 wherein said contact chamber includes a tubular inner chamber and a concentric outer chamber, said porous wall portion being cylindrically shaped and forming the defining wall between said inner and outer chambers.

9. A particle detector as defined in claim 8 wherein said porous wall portion is a ceramic material.

10. A particle detector as defined in claim 1 wherein said photodetector for detecting the nuclei concentration includes a lamp and photodetector operatively housed proximate to said chamber.

11. A particle detector as defined in claim 10 wherein said detecting means includes a mirror disposed, in facing relationship to said lamp and photodetector, between said humidifying means and said chamber.

12. A particle detector as defined in claim 1 and further comprising means for preventing outside light from effecting the reading of said photodetector.

13. A particle detector as defined in claim 12 wherein said preventing means includes a maze arrangement located between said humidifying means and said chamber.